(12) United States Patent
Jiang

(10) Patent No.: US 11,410,841 B2
(45) Date of Patent: Aug. 9, 2022

(54) ACCELERATOR MASS SPECTROMETRY MEASURING METHOD AND SYSTEM

(71) Applicant: Shan Jiang, Beijing (CN)

(72) Inventor: Shan Jiang, Beijing (CN)

(73) Assignee: Qixianhe (Beijing) Technology Co., Ltd., Beijing (CN)

( * ) Notice: Subject to any disclaimer, the term of this patent is extended or adjusted under 35 U.S.C. 154(b) by 0 days.

(21) Appl. No.: 17/017,794

(22) Filed: Sep. 11, 2020

(65) Prior Publication Data

US 2020/0411300 A1 Dec. 31, 2020

Related U.S. Application Data

(63) Continuation of application No. PCT/CN2019/077683, filed on Mar. 11, 2019.

(30) Foreign Application Priority Data

Mar. 12, 2018 (CN) .......................... 201810201635.6

(51) Int. Cl.
  *H01J 49/00* (2006.01)
  *H01J 49/10* (2006.01)
(52) U.S. Cl.
  CPC ........ *H01J 49/0086* (2013.01); *H01J 49/105* (2013.01)
(58) Field of Classification Search
  CPC .......................... H01J 49/0086; H01J 49/105
  See application file for complete search history.

(56) References Cited

U.S. PATENT DOCUMENTS

| | | | | |
|---|---|---|---|---|
| 5,569,915 A | * | 10/1996 | Purser | .................... H01J 49/32 250/281 |
| 5,783,823 A | * | 7/1998 | Mous | .................... B01D 59/44 250/281 |

(Continued)

FOREIGN PATENT DOCUMENTS

| | | |
|---|---|---|
| CN | 1362622 A | 8/2002 |
| CN | 1916622 A | 2/2007 |

(Continued)

OTHER PUBLICATIONS

Freeman, Stewart PHT, et al. "Radiocarbon positive-ion mass spectrometry." Nuclear Instruments and Methods in Physics Research Section B: Beam Interactions with Materials and Atoms 361 (2015): 229-232 (Year: 2015).*

(Continued)

*Primary Examiner* — Wyatt A Stoffa

(57) ABSTRACT

An accelerator mass spectrometry measuring system is disclosed, including: an ECR high-current positive ion source subsystem; an injector subsystem; a high-current accelerator subsystem; a high-energy analysis subsystem; and a high-resolution detector subsystem; of which, the ECR high-current positive ion source subsystem, the injector subsystem, the high-current accelerator subsystem, high-energy analysis subsystem and a high-resolution detector subsystem are connected sequentially; the ECR high-current positive ion source subsystem is configured for generating high-current positive ions of multi-charge states; the high-current accelerator subsystem is configured for accelerating the high-current positive ions. The AMS system is high in beam, high in overall efficiency, and strong in how-down capability, and can greatly improve the abundance sensitivity of measurement.

14 Claims, 3 Drawing Sheets

(56) References Cited

U.S. PATENT DOCUMENTS

| | | | | |
|---|---|---|---|---|
| 6,815,666 B2* | 11/2004 | Schroeder | ........... | H01J 49/0086 |
| | | | | 250/296 |
| 7,439,498 B2* | 10/2008 | Litherland | .......... | H01J 49/0086 |
| | | | | 250/288 |
| 8,432,090 B2* | 4/2013 | Colard | .................. | H05H 13/00 |
| | | | | 313/62 |
| 8,791,410 B2* | 7/2014 | Synal | ................... | H01J 49/005 |
| | | | | 250/281 |
| 10,128,095 B2* | 11/2018 | Freeman | ............ | H01J 49/0086 |
| 10,395,910 B2* | 8/2019 | Jiang | .................. | H01J 49/0086 |
| 10,573,502 B2 | 2/2020 | Vaes et al. | | |
| 10,748,754 B2* | 8/2020 | Jiang | .............. | H01J 49/025 |
| 11,246,209 B2* | 2/2022 | Sasai | ....................... | H05H 5/00 |
| 2004/0046116 A1* | 3/2004 | Schroeder | ........... | H01J 49/0086 |
| | | | | 250/296 |
| 2005/0218816 A1* | 10/2005 | Tantraporn | ............ | H01J 49/105 |
| | | | | 315/111.81 |
| 2006/0113464 A1* | 6/2006 | Litherland | ............ | B01D 59/44 |
| | | | | 250/288 |
| 2009/0114809 A1* | 5/2009 | Hotchkis | ................ | B01D 59/44 |
| | | | | 250/281 |
| 2013/0103337 A1* | 4/2013 | Eiler | ...................... | G16C 20/20 |
| | | | | 250/288 |
| 2014/0097338 A1* | 4/2014 | Eiler | ...................... | H01J 49/04 |
| | | | | 250/288 |
| 2017/0278691 A1 | 9/2017 | Okumura | | |
| 2018/0082828 A1* | 3/2018 | Jiang | ....................... | H01J 49/48 |
| 2019/0385830 A1* | 12/2019 | Mous | .................. | H01J 49/0086 |
| 2021/0104391 A1* | 4/2021 | Jiang | ..................... | H01J 49/061 |

FOREIGN PATENT DOCUMENTS

| | | |
|---|---|---|
| CN | 101916607 A | 12/2010 |
| CN | 105301088 A | 2/2016 |

OTHER PUBLICATIONS

Shanks, Richard P., et al. "Performance of the rebuilt SUERC single-stage accelerator mass spectrometer." Nuclear Instruments and Methods in Physics Research Section B: Beam Interactions with Materials and Atoms 361 (2015): 76-79 (Year: 2015).*

Wilcken, K. M., et al. "From carbon to actinides: a new universal 1MV accelerator mass spectrometer at ANSTO." Nuclear Instruments and Methods in Physics Research Section B: Beam Interactions with Materials and Atoms 361 (2015): 133-138 (Year: 2015).*

Paul, M., et al. "AMS of heavy elements with an ECR ion source and the ATLAS linear accelerator." Nuclear Instruments and Methods in Physics Research Section B: Beam Interactions with Materials and Atoms 172.1-4 (2000): 688-692 (Year: 2000).*

Internation Search Report of PCT/CN2019/077683, dated May 29, 2019.

\* cited by examiner

ACCELERATOR MASS SPECTROMETRY MEASURING METHOD AND SYSTEM

CROSS-REFERENCE TO RELATED APPLICATIONS

This application is a continuation of International Patent Application No. PCT/CN2019/077683 with a filing date of Mar. 11, 2019, designating the United States, now pending, and further claims priority to Chinese Patent Application No. 201810201635.6 with a filing date of Mar. 12, 2018. The content of the aforementioned applications, including any intervening amendments thereto, are incorporated herein by reference.

TECHNICAL FIELD

The present disclosure relates to the technical field of AMSs, more particularly, to an accelerator mass spectrometry measuring method and system.

BACKGROUND ART

AMS (Accelerator Mass Spectrometry) is a high-energy isotope mass spectrometer based on accelerator technology and ion detector technology, mainly used for measuring isotopic abundance ratio of cosmic-ray produced radionuclide such as 14C, 10Be, 26Al, 41Ca, 85Kr and 236U etc.

In the late 1970s, since the AMS started to show up, sputtering negative ion source has been used. The reason is, on one hand, the tandem accelerator has good-unity and high energy, which is beneficial for eliminating background; the negative ion source has a capability of eliminating isobaric background on the other hand. The isobaric of some radionuclide cannot form negative ions, for instance, the isobaric 14N cannot form negative ions when measuring 14C; the 26Mg cannot form negative ions when measuring 26Al. Therefor, the tandem accelerator AMS device based on negative ions is an ideal and advanced analysis apparatus used in geology and archaeology etc. In the prior arts, as shown in FIG. 1, the current AMS measuring system includes: a negative ion source system M10, an injector system M11, a tandem accelerator system M12, a high-energy analysis system M13 and a detector system 14, of which, the injector system M11 includes a former accelerating section S02 and a magnetic injection 11. The tandem accelerator system M12 includes a first accelerating section S03, a stripper S04 and a second accelerating section S05. The high-energy analysis system M13 includes a first analysis magnet S06, a first absorption membrane S07, an electrostatic analyzer S08 and a second analysis magnet 809. The AMS has an ability of eliminating molecular ion background and isobaric background thus greatly improving sensitivity of measurement, for instances, the abundance sensitivity of 14C isotopes measurement on $^{14}C/^{12}C$ can reach $1\times10^{-15}$ the abundance sensitivity of $^{10}Be$ isotopes measurement on $^{10}Be/^{9}Be$ can reach $3\times10^{-15}$.

However, along with developing of geological, environmental and marine sciences, the isotope abundance ratio of radionuclides to be measured ranges from $10^{-12}$ to $10^{-17}$, the current AMS apparatus cannot satisfy the need for the abundance sensitivity.

SUMMARY OF INVENTION

In view of the aforementioned problems, the present disclosure relates to an accelerator mass spectrometry measuring method and system.

To overcome the aforementioned problem, the accelerator mass spectrometry measuring system includes:
an ECR high-current positive ion source subsystem:
an injector subsystem;
a high-current accelerator subsystem;
a high-energy analysis subsystem and a high-resolution detector subsystem;
the ECR high-current positive ion source subsystem, the injector subsystem, the high-current accelerator subsystem, the high-energy analysis subsystem and the high-resolution detector subsystem are connected sequentially; and
the ECR high-current positive ion source subsystem is configured for generating high-current positive ions of multi-charge states, i.e. ions with +2, +3, +4 . . . even fully stripped state; the high-current accelerator subsystem is configured for accelerating the high-current positive ions.

Preferably, the high-current accelerator subsystem is a high-current single stage electrostatic accelerator, the high-current single stage electrostatic accelerator includes a plurality of accelerating tube units; a beam intensity of the high-current accelerator subsystem ranges from 10 mμA to 100 mA.

Preferably, elements processed by the ECR high-current positive ion source subsystem include at least one of H to Pu, actinide, and super actinide.

Preferably, the high-energy analysis subsystem includes: a first magnetic analyzer, a first absorption membrane, an electrostatic analyzer and a second magnetic analyzer, the first magnetic analyzer, the first absorption membrane, the electrostatic analyzer and the second magnetic analyzer are connected in sequence; the first absorption membrane is in a stationary state or a rotating state after the high-energy analysis subsystem is started.

Preferably, the high-resolution detector subsystem includes a second absorption membrane and a high-resolution detector which are connected in sequence; the second absorption membrane is in a stationary state or in a rotating state after the high-resolution detector subsystem is activated.

Preferably, the high-resolution detector subsystem is a 4ΔE gas detector.

Preferably, the injector subsystem includes: a front acceleration section and a low-energy end magnetic analyzer which are connected in sequence; the low-energy magnetic analyzer is configured for selecting mass-to-charge ratio of ions to be accelerated.

Preferably, further including: a control subsystem that is respectively connected with the ECR high-current positive ion source subsystem, the injector subsystem, the high-current accelerator subsystem, the high-energy analysis subsystem and the high-resolution detector subsystem to control operation of all subsystems.

Accordingly, the present disclosure further discloses an accelerator mass spectrometry measuring method, including:
generating high-current positive ions of multi-charge states by an ECR high-current positive ion source subsystem;
injecting the high-current positive ions into a high-current accelerator subsystem by an injector subsystem;
accelerating the high-current positive ions by the high-current accelerator subsystem with an accelerating voltage corresponding to the high-current positive ions;
carrying out high-energy analysis on ion beams outputted from the high-current accelerator subsystem by a high-energy analysis subsystem;

detecting positive ions after high-energy analysis by a high-resolution detector subsystem.

Embodiments of the present disclosure have following advantages:

Firstly, high-strength beam intensity, since the ECR high-current positive ion source subsystem may produce ions of multi-charge states such as −1, +2, +3 etc., the beam intensity thereof may range from 10 mµA to 100 mA, which is more than 100 times compared with the beam intensity obtained by the traditional AMS to sputter negative ion sources.

Secondly, high efficiency, the producing efficiency of ion sources and conveying efficiency of the system can reach 1% to 10%, the overall efficiency thereof is higher than 10 to 1000 times compared with traditional AMS.

Thirdly, high-energy ions, the energy of accelerated ions is proportional to the charge state, only if more than +2 charge state are selected, the overall energy may higher than the energy of the ions generated by traditional AMS (usually less than 1 MV).

Fourthly, multi-charge state without molecular ion background, the ECR high-current positive ion source subsystem generates multi-charge states without generating molecular ions.

Fifthly, simple structure and easy to be miniaturized, since the ECR high-current positive ion source fails to generate molecular ions, there is no stripper S04 that is needed in the prior art AMS; and since the ECR high-current positive ion source generates ions of multi-charge states, the analyzing magnet and the electrostatic analyzer in the system could be minimized.

Sixthly, inert gas is available for AMS measuring, the prior art AMS uses negative ion sources, but the inert gas cannot generate negative ions, therefor the inert gas is not available for AMS measuring in the prior art. The ECR ion sources in the system is easy to ionize the inert gas to positive ions, and thus realize measurement of inert gas such as $^{85}$Kr and 133Xe.

In conclusion, due to the aforementioned advantages, the AMS system of the present disclosure is high in beam, high in overall efficiency and strong in how-down capability, and can greatly improve the abundance sensitivity of measurement. The isotope abundance ratio can reach a range from $10^{-16}$ to $10^{-18}$, which is higher than 10 to 1000 times compared with traditional AMS.

DESCRIPTION OF EMBODIMENTS

To make the aim, purpose and advantage more understandable, a further description to the present disclosure will be laid out hereinafter.

First Embodiment

Figure 2:
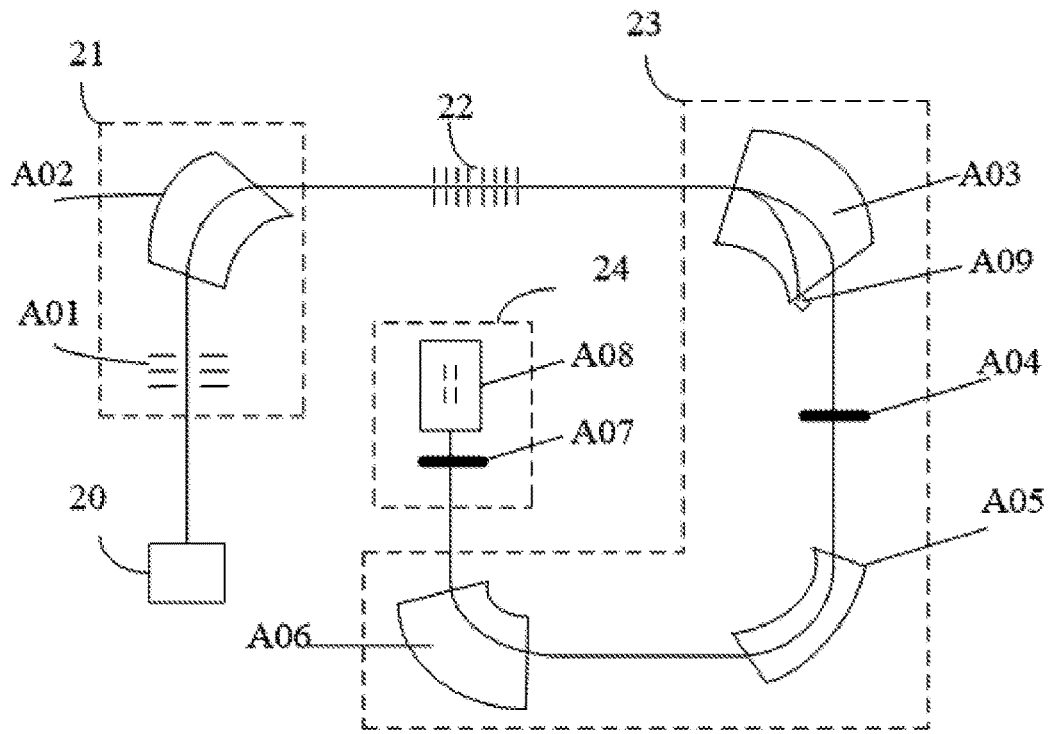
FIG. 2 is a structural diagram of an accelerator mass spectrometry measuring system according to embodiments of the present disclosure.

With reference to FIG. 2, which is a structural diagram of an accelerator mass spectrometry measuring system according to embodiments of the present disclosure. The accelerator mass spectrometry measuring system includes:

an ECR high-current positive ion source subsystem 20;
an injector subsystem 21; a high-current accelerator subsystem 22;
a high-energy analysis subsystem 23 and a high-resolution detector subsystem 24;

the ECR high-current positive ion source subsystem 20, the injector subsystem 21, the high-current accelerator subsystem 22, the high-energy analysis subsystem 23 and the high-resolution detector subsystem 24 are connected sequentially.

As shown in FIG. 2, the ECR high-current positive ion source subsystem 20 is connected with an input end of the injector subsystem 21, an output end of the injector subsystem 21 is connected with an input end of the high-current accelerator subsystem 22, an output end of the high-current accelerator subsystem 22 is connected with an input end of the high-energy analysis subsystem 23; an output end of the high-energy analysis subsystem 23 is connected with an input end of the high-resolution detector subsystem 24.

Additionally, the ECR high-current positive ion source subsystem 20 is configured for generating high-current positive ions of multi-charge states.

According to embodiments of the present disclosure, the ECR high-current positive ion source subsystem 20 is configured for generating high-current positive ions of multi-charge states, i.e. ions with +2, +3 etc., for instance, ions of $Be^{2+}$ or $Be^{3+}$.

Figure 3:
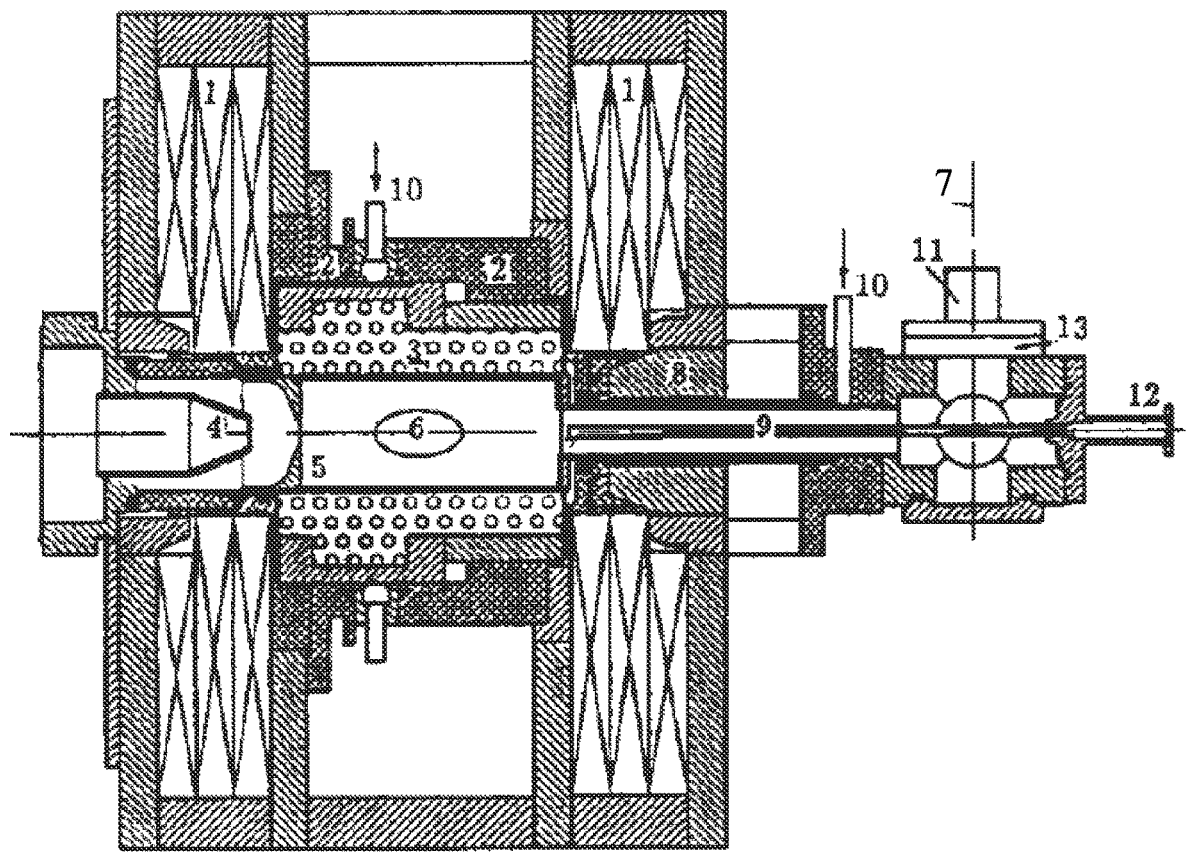
FIG. 3 is a structural diagram of an ECR high-current positive ion source according to embodiments of the present disclosure.
Figure 4:
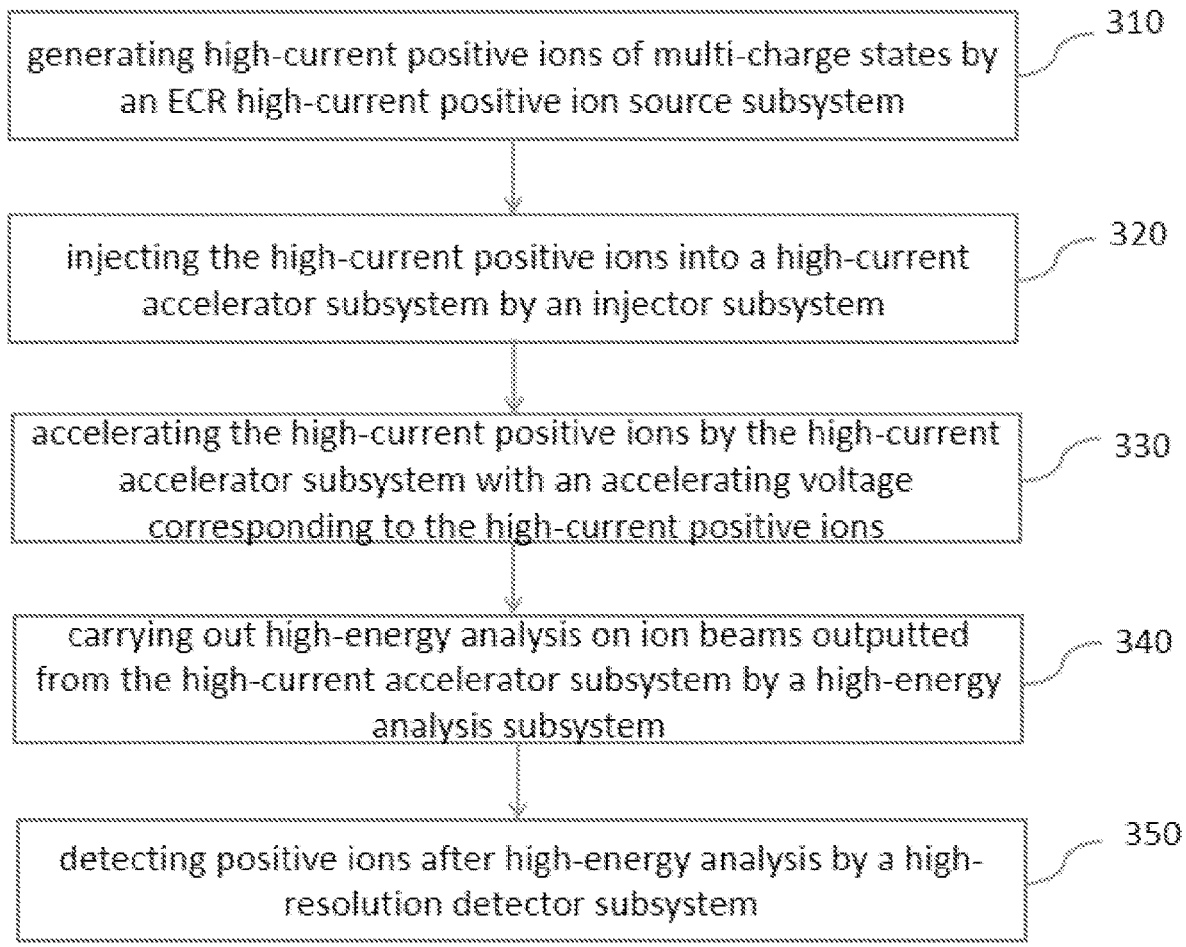
FIG. 4 is a flow chart of an accelerator mass spectrometry measuring method according to embodiments of the present disclosure.

The ECR ion source heat plasmas by using microwave, electrons obtain power from the microwave to become high-energy electrons. Free atoms in the high-energy electrons generate ECR plasmas. The ECR plasmas is restrained by a magnetic field with minimum B. Therefore, the ions in the plasmas have plenty of time to be gradually separated to generate ions of high-charge state; the ions are proceeded by high voltage to form ion beams that are supplied to an accelerator. Microwaves are fed into the plasma area via a waveguide or coaxial line. When the microwave frequency ωRF is equal to the electron's cyclotron motion frequency ωce in the magnetic field, that is, ωce=ωRF=eB/me, resonance will occur and energy will be absorbed from the microwave to produce high-energy electrons. For a fixed ωRF, B is also determined. As shown in FIG. 3, which shows a structural diagram of an ECR high-current positive ion source according to embodiments of the present disclosure. The ECR high-current positive ion source in FIG. 3 includes following structures: a wire package 1, an insulation cover 2, a permanent magnet 3, an extraction electrode 4, an arc cavity 5, a plasma 6, a quartz tube, an injection cone 8, a coaxial inner tube 9, a cooling water inlet and outlet 10, a wave guide 11, an air inlet □ 12 and a microwave tube 13. As shown in FIG. 3, the wire package 1 and the permanent magnet 3 form the needed magnetic field. The microwave is fed through a microwave window and transmitted along the coaxial inner tube into the are cavity, heats the plasma, and generates ions that is further drawn out through the system. To obtain ions of high-charge state, ECR plasma must be well confined, which requires a reasonable magnetic confinement field shape. Generally, the magnetic field is a superposition of the multi-pole radial field in the axial situation. The axial field is composed of a pair of magnetic mirrors. The electrons are restricted by the magnetic mirror field and move back and forth between the magnetic mirrors, increasing the chance of being heated. The radial field is generally composed of multi-pole permanent magnets, which can confine the plasma well in a radial direction. Of course, in the embodiments of the present application, based on the principle of ECR, ECR high-current positive ion source subsystems in other structural components may also be used, which is not limited in the embodiments of the present application.

Preferably, elements processed by the ECR high-current positive ion source subsystem 20 include at least one of H to Pu, actinide, and super actinide.

In embodiments of the present disclosure, the elements selected from at least one of H to Pu, actinide, and super actinide, processed by the ECR high-current positive ion source subsystem 20, are capable of generating ions of multi-charge states such as +1, +2, +3, +4, etc.

In embodiments of the present disclosure, the subsystem can measure $^{10}Be$ and $^{14}C$ and also measure isotopes such as $^{3}H$, $^{26}Al$, $^{32}Si$, $^{36}Cl$, $^{41}Ca$, $^{129}I$, U and Pu, and super actinide, more especially realize highly sensitive measurement of other inert gases such as 39Ar, $^{85}Kr$ and $^{133}Xe$.

In which, the high-current accelerator subsystem 22 is configured for accelerating high-current positive ions.

Figure 1:
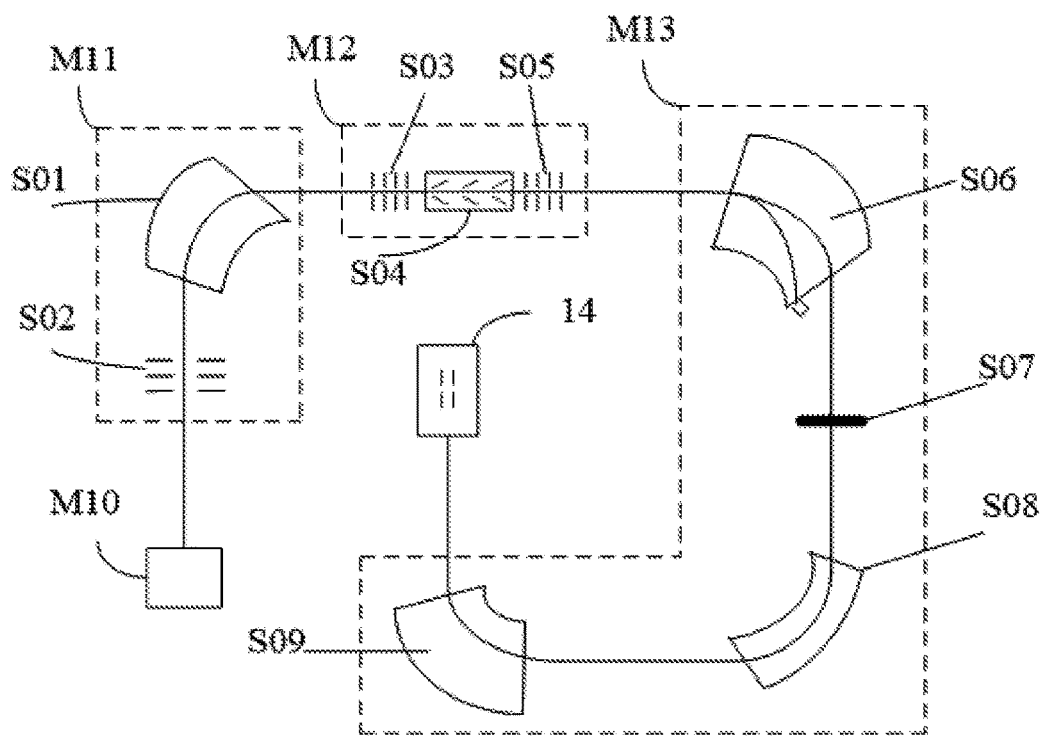
FIG. 1 is a structural diagram of the prior AMS system.

In the embodiments of the present disclosure, since the injector subsystem 21 injects high-current positive ion beams, but when the ECR high-current positive ion source subsystem 20 generates high-current ions of multi-charge states such as +2, +3, +4 etc., they are positive ions, not molecular ions. Therefore, the high-current accelerator subsystem 22 may only have acceleration function without the stripper S04 in the traditional AMS. In the traditional AMS, Since it uses a sputtering negative ion source 10 as shown in FIG. 1, the negative ion source 10 would generate molecular ions when it generates negative ions. Therefore, the tandem accelerator system M12 in use must include the stripper S04, which strips the negative ions into Positive ions, and molecular ions are unstable after being stripped into positive ions, leading to dissociate, and thus may be separated.

Preferably, the high-current accelerator subsystem 22 is a high-current single stage electrostatic accelerator, the high-current single stage electrostatic accelerator includes a plurality of accelerating tube units; a beam intensity of the high-current accelerator subsystem ranges from 10 μA to 100 mA.

Understandable, the high-current single stage electrostatic accelerator has no gas or solid glass components, the beam intensity that can be accelerated is in the range of 10 μA~100 mA. The high-current single stage electrostatic accelerator has no stripper with consequently simple structure, and easy to be maintained.

Preferably, the accelerating voltage of the high-current accelerator subsystem 22 ranges from 0~800 kV.

There may also be a control system that controls other subsystems to work, such as controlling the accelerating voltage of the high-current accelerator subsystem 22.

Preferably, in another embodiment, with reference to FIG. 2, the injector subsystem 21 includes: a pre-accelerating section A01 and a low-energy magnetic analyzer A02; the pre-accelerating section A01 and the low-energy magnetic analyzer A02 are connected in sequence. The low-energy magnetic analyzer is configured for selecting mass-to-charge ratio of the ions to be accelerated.

As shown in FIG. 2, an output end of the high-current accelerator subsystem 22 is connected with an input end of the pre-accelerating section A01, an output end of the pre-accelerating section A01 is connected with an input end of the low-energy magnetic analyzer A02. The output end of the low-energy magnetic analyzer A02 is connected with the input end of the high-current accelerator subsystem 22.

It needs to be illustrated, the pre-accelerating section A01 may be an accelerating tube of 20 kV~80 kV, used for acceleration beforehand, after the ions pass through the low-energy end magnetic analyzer A02, a good mass resolution can be obtained, in which, the low-energy end magnetic analyzer A02 can be used to inject the magnet, which is used to select the mass-to-charge ratio of the ion to be accelerated, where the mass-to-charge ratio is the ratio of the mass number to the charge state. For example, if $^{9}Be^{3+}$ is selected for acceleration, its mass-to-charge ratio is 9/3.

Preferably, in another embodiment, with reference to FIG. 2, the high-energy analyzer subsystem 23 includes a first magnetic analyzer A03, a first absorption membrane A04, an electrostatic analyzer A05 and a second magnetic analyzer A06; the first magnetic analyzer A03, the first absorption membrane A04, the electrostatic analyzer A05 and the second magnetic analyzer A06 are connected in sequence; the first absorption membrane A09 is in a stationary state or a rotating state after the high-energy analysis subsystem is started.

As shown in FIG. 2, an output end of the high-current accelerator subsystem 22 is connected with an input end of the first magnetic analyzer A03; between an output end of the first magnetic analyzer A03 and the electrostatic analyzer A05 has the first absorption membrane A04; an output end of the electrostatic analyzer A05 is connected with an input end of the second magnetic analyzer A06.

In which, the first magnetic analyzer A03 is configured for eliminating the isotopic background with the same charge state. For instance, when measuring $10Be^{3+}$, there is an interference with stable isotope $^{9}Be^{3+}$ etc., thus the first magnetic analyzer A03 is configured for eliminating $^{9}Be^{3+}$. The first absorption membrane A04 is configured for eliminating the interference with the isobars. When measuring $^{10}Be^{3+}$, there is an strong interference with $^{10}B^{3+}$, thus the first absorption membrane A04 can eliminate $^{10}B^{3+}$. Since the absorption of the membrane is related to the atomic number of incident ions, when both $^{10}Be^{3+}$ and $^{10}B^{3+}$ pass through this absorption membrane A04, the energy therebetween would be different. The electrostatic analyzer A05 and the second magnetic analyzer A06 may select $^{10}Be^{3+}$ and eliminate $^{10}B^{3+}$.

In which, a Faraday cup is also provided at the output end of the first magnetic analyzer A03, which is used to measure the isotope which is not in the high-resolution detector subsystem 24.

In some embodiments, the first absorption membrane (Si3N4) A04 can stand still, which is similar with the traditional AMS.

Preferably, the first absorption membrane (Si3N4) can be rotated, by rotating the first absorption film, the thickness of high-energy particles passing through the absorption film can be changed, which is more conducive to the elimination of isobaric background.

Preferably, in another embodiment, with reference to FIG. 2, the high-resolution detector subsystem 24 includes a second absorption membrane A07 and a high-resolution detector A08 which are connected in sequence; the second absorption membrane A07 is in a stationary state or in a rotating state after the high-resolution detector subsystem 24 is activated.

With reference to FIG. 2, between an output end of the second magnetic analyzer A06 and the high-resolution detector A08 has a second absorption membrane A07.

In practice, the second absorption membrane A07 is disposed before the window of the high-resolution detector A08.

In practice, the second absorption membrane (SiN) A07 may stand still, which is similar to the traditional AMS.

Preferably, the second absorption membrane A07 may be rotated, rotating the second absorption membrane A07 may change thickness of the high-energy ions passing through the absorption membrane, which is more convenient to eliminate the isobaric background.

Since the high-energy analysis subsystem 23 cannot completely eliminate the interference of the isobars, for example, when measuring $^{10}Be^{3+}$, there would still be a certain amount of $^{10}B^{3+}$, and the second absorption membrane A07 is used to make the energy difference between $^{10}Be^{3+}$ and $^{10}B^{3+}$ again. In this way, the high-resolution detector A08 may be used to eliminate $^{10}B^{3+}$ while recording $^{10}Be^{3+}$.

Preferably, the high-resolution detector subsystem is a 4ΔE gas detector.

Understandable, 4ΔE represents a gas detector with two cathodes and two anodes. The energy resolution of the 4ΔE gas detector is significantly improved, and combined with the energy difference produced by the second absorption membrane A07, the detector subsystem 24 has a greatly enhanced ability to eliminate isobaric background. The 4ΔE gas detector can be understood as a gas ionization chamber.

Of course, according to embodiments of the present disclosure, a gas detector with more cathodes and more anodes can be used, no limitation thereto in the present application.

Preferably, the system further includes a control subsystem that is respectively connected with the ECR high-current positive ion source subsystem, the injector subsystem, the high-current accelerator subsystem, the high-energy analysis subsystem and the high-resolution detector subsystem to control operation of all subsystems.

In this embodiment, the control subsystem may be set up by a computer system, in which the computer system sends requests to control subsystems.

In the AMS technical field, taking into account two things: first, the tandem accelerator has good unity and high energy, which is beneficial for eliminating background; second, the negative ion source has a capability of eliminating isobaric background. The isobars of some radionuclide cannot form negative ions, for instance, the isobar $^{14}N$ cannot form negative ions when measuring $^{14}C$; the isobar $^{26}Mg$ cannot form negative ions when measuring $^{26}Al$. Therefor, since the AMS started to show up, sputtering negative ion source has been used. However, along with developing of geological, environmental, archaeology and marine sciences, the isotope abundance ratio of radionuclides to be measured ranges from $10^{-12}$ to $10^{-17}$, the current AMS apparatus cannot satisfy the need for the abundance sensitivity.

In the present disclosure, the inventors disclose an AMS measuring system based on the ECR ion sources, the method of the ECR high-current positive ion source subsystem extracting positive ions of multi-charge states is firstly introduced in AMS technical field, the method has the following advantages:

Higher ion power is gained by the ECR high-current positive ion source subsystem extracting positive ions of multi-charge states, when there is higher ion powers, it is more beneficial to eliminate background while provide abundance sensitivity. For instance, if the accelerating voltage of the accelerator is 600 kV, when extracting ions of 1+ charge state, the ion powers of the $10Be^{1+}$ and $10B^{1+}$ are both 600 KV; when extracting ions of 2+ charge state, the ion powers of the $10Be^{1+}$ and $10B^{2+}$ are both 1200 KV, of which the ion energy has positive correlation with the charge state. And the improvement of the ion energy has a positive correlation with how much to eliminate 10B.

The embodiment of the present disclosure has following advantages:

Firstly, high-strength beam intensity, since the ECR high-current positive ion source subsystem may produce ions of multi-charge states such as +2, +3, +4, . . . , etc., the beam intensity thereof may range from 10 μA to 100 mA, which is more than 100 times compared with the beam intensity obtained by the traditional AMS to sputter negative ion sources.

Secondly, high efficiency, the producing efficiency of ion sources and conveying efficiency of the system can reach 1% to 10%, the overall efficiency thereof is higher than 10 to 1000 times compared with traditional AMS.

Thirdly, high-energy, the energy of accelerated ions is proportional to the charge state, only more than +2 charge state are selected, the overall energy may be higher than the energy of the ions generated by traditional AMS (usually less than 1 MV).

Fourthly, high charge state without molecular ion background, the ECR high-current positive ion source subsystem generates multi-charge states without generating molecular ions.

Fifthly, the ability to depress 10B with the 2+ charge state is stronger. 2+10B has low ionization degree and high energy to depress the 10B.

Sixthly, the detecting line is lower, which ranges from 10 to 100 atoms. The detection line of traditional AMS ranges from 100 to 10000 atoms.

Seventhly, inert gas such as $^{39}Ar$, $^{85}Kr$ and $^{133}Xe$ etc. is available for AMS measuring.

In conclusion, due to the aforementioned advantages, the AMS system of the present disclosure is high in beam, high in overall efficiency and strong in how-down capability, and can greatly improve the abundance sensitivity of measurement. The isotope abundance ratio can reach a range from $10^{-16}$ to $10^{-18}$, which is higher than 10 to 1000 times compared with the traditional AMS.

Second Embodiment

With reference to FIG. 3, which shows a flow chart of an accelerator mass spectrometry measuring method according to the embodiment of the present disclosure, the method includes:

Step 310, generating high-current positive ions of multi-charge states by the ECR high-current positive ion source subsystem.

As described in embodiment one, the ECR high-current positive ion source subsystem may be used to detect objects that need to be measured, generating positive ions of multi-charge states, such as $Be^{2+}$ or, $Be^{3+}$ etc.

Of course, in some embodiments, the subsystem can measure $^{10}Be$ and $^{14}C$, and also measure for $^{3}H$, $^{26}Al$, $^{32}Si$, $^{36}Cl$, $^{41}Ca$, $^{129}I$, U and Pu, isotope and super actinide, and other nuclide measurement, more especially realize highly sensitive measurement of other inert gases such as $^{85}Kr$ and $^{133}Xe$.

Step 320, injecting the high-current positive ions into a high-current accelerator subsystem by an injector subsystem;

After high-current positive ion beams generated by the ECR high-current positive ion source subsystem is outputted to the injector subsystem, the former accelerating section A01 is used to accelerate the beams beforehand, after the ions pass through the low-energy end magnetic analyzer A02, a good mass resolution can be obtained. The low-energy end magnetic analyzer A02 is used to select the mass-to-charge ratio of the ion to be accelerated, where the mass-to-charge ratio is the ratio of the mass number to the charge state. For example, if $^9Be^{3+}$ is selected for acceleration, its mass-to-charge ratio is 9/3.

Step 330, accelerating the high-current positive ions by the high-current accelerator subsystem with an accelerating voltage corresponding to the high-current positive ions.

The accelerating voltage of the high-current accelerator subsystem 22 ranges from 0~800 kV. The subsystem 22 can directly accelerate the ion beams selected by the low-energy end magnetic analyzer A02 without the stripper, thus no need to perform stripping operation on the ion beams.

Step 340, carrying out high-energy analysis on ion beams outputted from the high-current accelerator subsystem by a high-energy analysis subsystem.

According to embodiments of the present disclosure, the high-energy analysis subsystem 23 includes: a first magnetic analyzer A03, a first absorption membrane A04, an electrostatic analyzer A05 and a second magnetic analyzer A06. The first absorption membrane A04 is configured for eliminating the interference with the isobars. When measuring $^{10}Be^{3+}$, there is an strong interference with $^{10}B^{3+}$, thus the first absorption membrane A04 can eliminate $^{10}B^{3+}$. Since the absorption of the membrane is related to the atomic number of incident ions, when both $^{10}Be^{3+}$ and $^{10}B^{3+}$ pass through this absorption membrane A04, the energy therebetween would be different. The electrostatic analyzer A05 and the second magnetic analyzer A06 may select $^{10}Be^{3+}$ and eliminate $^{10}B^{3+}$ based on the differential between $^{10}Be^{3+}$ and $^{10}B^{3+}$.

Of course, according to embodiments of the present disclosure, the thickness of high-energy particles passing through the absorption film can be changed, which is more conducive to the elimination of isobaric background.

Step 350, detecting positive ions after high-energy analysis performed by a high-resolution detector subsystem.

As mentioned above, the high-resolution detector subsystem 24 includes a second absorption membrane A07 and a high-resolution detector A08. Because the high-energy analyzer subsystem 23 cannot completely eliminate the interference of the isobars, for example, when measuring $^{10}Be^{3+}$, there would still be a certain amount of $^{10}B^{3+}$, and the second absorption membrane A07 is used to make the energy difference between $^{10}Be^+$ and $^{10}B^{3+}$ again. In this case, the high-resolution detector A08 may be used to eliminate $^{10}B^{3+}$ while recording $^{10}Be^{3+}$.

Of course, in embodiments of the present disclosure, by rotating the second absorption membrane A07 may change thickness of the high-energy ions passing through the absorption membrane, which is more convenient to eliminate the isobaric background.

The embodiment of the present disclosure has following advantages:

1. high-strength beam intensity; 2. high-efficiency; 3. high-energy; 4. high-charge state without molecular ion background; 5. simple structure and easy to be miniaturized; 6. available for AMS measurement on inert gas; 7. strong capability of using 2+ charge state to depress 10B; 2+10B has a low ionization degree, and high-energy to depress 10B; 8. the detecting line is lower, which ranges from 10 to 100 atoms, whereas, the detection line of traditional AMS ranges from 100 to 10000 atoms.

In conclusion, due to the aforementioned advantages, the AMS system of the present disclosure is high in beam, high in overall efficiency and strong in how-down capability, and can greatly improve the abundance sensitivity of measurement. The isotope abundance ratio can reach a range from $10^{-16}$ to $10^{-18}$, which is higher than 10 to 1000 times compared with traditional AMS.

Further, the description for the second embodiment about the measuring method is comparatively simple since the second embodiment is similar with the aforementioned device embodiment.

Further, the description between every embodiment is laid out progressively, the differentials between every embodiment are illustrated purposely, the similarity between every embodiment can be referred each other.

What is claimed is:

1. An accelerator mass spectrometry measuring system, comprising:
   an ECR high-current positive ion source subsystem;
   an injector subsystem;
   a high-current accelerator subsystem;
   a high-energy analysis subsystem; and
   a high-resolution detector subsystem;
   wherein, the ECR high-current positive ion source subsystem, the injector subsystem, the high-current accelerator subsystem, high-energy analysis subsystem and a high-resolution detector subsystem are connected sequentially; the ECR high-current positive ion source subsystem is configured to process elements to generate high-current positive ions of multi-charge states; the high-current accelerator subsystem is configured for accelerating the high-current positive ions;
   wherein, the elements processed by the ECR high-current positive ion source subsystem comprise at least one of H to super actinide; the multi-charge states comprise charge states greater than or equal with +2; the high-current positive ions of multi-charge states do not comprise molecular ions;
   wherein the high-current accelerator subsystem is a high-current single stage electrostatic accelerator without a stripper.

2. The accelerator mass spectrometry measuring system of claim 1, wherein, the high-current single stage electrostatic accelerator comprising a plurality of accelerating tube units; a beam intensity of the high-current accelerator subsystem ranges from 10 μA to 100 mA.

3. The accelerator mass spectrometry measuring system of claim 1, wherein, the high-energy analysis subsystem comprises: a first magnetic analyzer, a first absorption membrane, an electrostatic analyzer and a second magnetic analyzer, the first magnetic analyzer, the first absorption membrane, the electrostatic analyzer and the second magnetic analyzer are connected in sequence; the first absorption membrane is in a stationary state or a rotating state after the high-energy analysis subsystem is started.

4. The accelerator mass spectrometry measuring system of claim 1, wherein, the high-resolution detector subsystem comprises a second absorption membrane and a high-resolution detector which are connected in sequence; the second absorption membrane is in a stationary state or in a rotating state after the high-resolution detector subsystem is activated.

5. The accelerator mass spectrometry measuring system of claim 1, wherein, the high-resolution detector subsystem is a gas detector with two cathodes and two anodes.

6. The accelerator mass spectrometry measuring system of claim 1, wherein, the injector subsystem comprises: a pre-acceleration section and a low-energy end magnetic analyzer which are connected in sequence; the low-energy magnetic analyzer is configured for selecting mass-to-charge ratio of ions to be accelerated.

7. The accelerator mass spectrometry measuring system of claim 1, further comprising: a control subsystem that is respectively connected with the ECR high-current positive ion source subsystem, the injector subsystem, the high-current accelerator subsystem, the high-energy analysis subsystem and the high-resolution detector subsystem to control operation of all subsystems.

8. An accelerator mass spectrometry measuring method comprising:
   generating high-current positive ions of multi-charge states by processing elements by an ECR high-current positive ion source subsystem;
   injecting the high-current positive ions into a high-current accelerator subsystem by an injector subsystem; wherein the high-current accelerator subsystem is a high-current single stage electrostatic accelerator without a stripper;
   accelerating the high-current positive ions by the high-current accelerator subsystem with an accelerating voltage corresponding to the high-current positive ions;
   carrying out high-energy analysis on ion beams outputted from the high-current accelerator subsystem by a high-energy analysis subsystem;
   detecting positive ions after high-energy analysis by a high-resolution detector subsystem;
   wherein, the elements processed by the ECR high-current positive ion source subsystem comprise at least one of H to super actinide; the multi-charge states comprise charge states greater than or equal with +2; the high-current positive ions of multi-charge states do not comprise molecular ions.

9. An accelerator mass spectrometry measuring system, comprising:
   an ECR high-current positive ion source subsystem;
   an injector subsystem;
   a high-current accelerator subsystem;
   a high-energy analysis subsystem; and
   a high-resolution detector subsystem;
      wherein, the ECR high-current positive ion source subsystem, the injector subsystem, the high-current accelerator subsystem, high-energy analysis subsystem and a high-resolution detector subsystem are connected sequentially; the ECR high-current positive ion source subsystem is configured to process elements to generate high-current positive ions of multi-charge states; the high-current accelerator subsystem is configured for accelerating the high-current positive ions;
      wherein, the elements processed by the ECR high-current positive ion source subsystem comprise at least one of H to super actinide; the multi-charge states comprise charge states greater than or equal with +2; the high-current positive ions of multi-charge states do not comprise molecular ions;
      the high-resolution detector subsystem is a gas detector with two cathodes and two anodes.

10. The accelerator mass spectrometry measuring system of claim 9, wherein, the high-current accelerator subsystem is a high-current single stage electrostatic accelerator, the high-current single stage electrostatic accelerator comprising a plurality of accelerating tube units; a beam intensity of the high-current accelerator subsystem ranges from 10 µA to 100 mA.

11. The accelerator mass spectrometry measuring system of claim 9, wherein, the high-energy analysis subsystem comprises: a first magnetic analyzer, a first absorption membrane, an electrostatic analyzer and a second magnetic analyzer, the first magnetic analyzer, the first absorption membrane, the electrostatic analyzer and the second magnetic analyzer are connected in sequence; the first absorption membrane is in a stationary state or a rotating state after the high-energy analysis subsystem is started.

12. The accelerator mass spectrometry measuring system of claim 9, wherein, the high-resolution detector subsystem comprises a second absorption membrane and a high-resolution detector which are connected in sequence; the second absorption membrane is in a stationary state or in a rotating state after the high-resolution detector subsystem is activated.

13. The accelerator mass spectrometry measuring system of claim 9, wherein, the injector subsystem comprises: a pre-acceleration section and a low-energy end magnetic analyzer which are connected in sequence; the low-energy magnetic analyzer is configured for selecting mass-to-charge ratio of ions to be accelerated.

14. The accelerator mass spectrometry measuring system of claim 9, further comprising: a control subsystem that is respectively connected with the ECR high-current positive ion source subsystem, the injector subsystem, the high-current accelerator subsystem, the high-energy analysis subsystem and the high-resolution detector subsystem to control operation of all subsystems.

* * * * *